(12) United States Patent
Bravo

(10) Patent No.: US 10,463,146 B1
(45) Date of Patent: Nov. 5, 2019

(54) APPARATUSES AND METHODS FOR CREATING FOLDABLE TABLES FOR READY ASSEMBLY

(71) Applicant: Pedro Bravo, Hawthorne, CA (US)

(72) Inventor: Pedro Bravo, Hawthorne, CA (US)

( * ) Notice: Subject to any disclaimer, the term of this patent is extended or adjusted under 35 U.S.C. 154(b) by 0 days.

(21) Appl. No.: 16/029,268

(22) Filed: Jul. 6, 2018

(51) Int. Cl.
*A47B 3/06* (2006.01)
*A47B 13/08* (2006.01)
*F16B 5/00* (2006.01)
*F16B 12/04* (2006.01)
*A47B 13/00* (2006.01)

(52) U.S. Cl.
CPC .............. *A47B 3/06* (2013.01); *A47B 13/003* (2013.01); *A47B 13/088* (2013.01); *F16B 5/002* (2013.01); *F16B 12/04* (2013.01)

(58) Field of Classification Search
CPC ....... A47B 3/06; A47B 13/003; A47B 13/088; A47B 2220/0086; A47B 2230/0085; A47B 47/06; F16B 5/002; F16B 12/04
See application file for complete search history.

(56) References Cited

U.S. PATENT DOCUMENTS

| | | | | |
|---|---|---|---|---|
| 1,645,336 A * | 10/1927 | McGlothern | ............. | A47B 3/12 108/159 |
| 2,000,915 A * | 5/1935 | Blake | ....................... | A47B 3/06 108/118 |
| 3,227,106 A * | 1/1966 | Waddell | ................. | A47B 43/02 108/14 |
| 3,438,345 A * | 4/1969 | Otey | ......................... | A47B 3/00 108/115 |
| 3,566,808 A * | 3/1971 | Slate, Jr. | ................... | A47B 3/12 108/157.14 |
| 3,714,908 A * | 2/1973 | Notko | ....................... | A47B 3/12 108/157.14 |
| 3,729,244 A * | 4/1973 | Butler | ....................... | A47B 3/12 108/115 |
| 4,340,251 A * | 7/1982 | Geoffroy-Dechaume | .................... | A47C 4/021 297/440.12 |
| 4,807,539 A * | 2/1989 | Del Castillo von Haucke | ............ | A47B 17/00 108/60 |
| 6,206,473 B1 * | 3/2001 | Kondratiev | .......... | A47B 13/003 297/440.1 |
| 6,267,065 B1 * | 7/2001 | Lin | ....................... | A47B 13/003 108/157.14 |
| 8,397,651 B2 * | 3/2013 | Levy | ........................ | A47B 1/04 108/166 |

(Continued)

*Primary Examiner* — Hanh V Tran

(57) ABSTRACT

A method and apparatus for assembling a recyclable foldable table made up of six cardboard members that flat-pack into a box for portability and storage are disclosed. In certain embodiments, a foldable table comprises at least one leg member, at least one support member, and at least one tabletop member. In some embodiments, an assembled foldable table may comprise a first leg member, a second leg member, a first tabletop member, a second tabletop member, a left support member, and a right support member. In many embodiments, various members may comprise a plurality of slits that allow members to slot together at specified locations to form an assembled foldable table. In many embodiments, the members are composed of cardboard. By utilizing a foldable table with cardboard members, a user can receive the benefits of a sturdy table without the cost and weight of an alternative table.

20 Claims, 10 Drawing Sheets

(56) References Cited

U.S. PATENT DOCUMENTS

| | | | |
|---|---|---|---|
| 10,278,490 B1* | 5/2019 | Magana | A47B 3/06 |
| 2003/0107254 A1* | 6/2003 | Willy | A47B 3/06 |
| | | | 297/440.13 |
| 2003/0107255 A1* | 6/2003 | Willy | A47B 3/06 |
| | | | 297/440.13 |
| 2006/0209815 A1* | 9/2006 | Castro-Estevez | |
| | | | A47B 47/0075 |
| | | | 370/379 |
| 2008/0237319 A1 | 10/2008 | Hensey et al. | |
| 2009/0066140 A1* | 3/2009 | Berent | A47B 3/06 |
| | | | 297/440.13 |
| 2010/0096964 A1* | 4/2010 | Bertele | A47B 43/02 |
| | | | 312/259 |
| 2013/0080286 A1* | 3/2013 | Rotholz | A47C 5/005 |
| | | | 705/26.5 |
| 2015/0173504 A1* | 6/2015 | Price | A47B 3/06 |
| | | | 108/185 |
| 2015/0282609 A1* | 10/2015 | Rotholz | B31D 5/04 |
| | | | 248/174 |
| 2015/0313355 A1* | 11/2015 | Holmes | A47B 3/00 |
| | | | 108/100 |
| 2018/0035799 A1* | 2/2018 | Leafgren | A47B 23/00 |
| 2018/0213926 A1* | 8/2018 | Brensinger | A47B 3/002 |
| 2019/0040890 A1* | 2/2019 | Davis | F16B 5/0012 |

\* cited by examiner

APPARATUSES AND METHODS FOR CREATING FOLDABLE TABLES FOR READY ASSEMBLY

FIELD OF THE INVENTION

The present invention generally relates to tables and more specifically to foldable tables that are recyclable, portable, and easy to store.

BACKGROUND

Tables are used for a variety of purposes from providing an elevated surface for household items, providing a usable workspace, and serving as pieces of furniture. Foldable tables, in particular, often provide additional portability and ease of storage. Usually, this occurs by folding and unfolding the leg or other portions of the table to minimize the space occupied by the table.

SUMMARY OF THE INVENTION

The present invention relates to apparatuses and methods for creating foldable tables for ready assembly that are recyclable, portable, and easy to store compared to traditional foldable tables. The various embodiments of the present invention contain several features, no single one of which is solely responsible for their desirable attributes. Without limiting the scope of the present embodiments, the more prominent features will now be discussed below. In particular, the present foldable tables for ready assembly will be discussed in the context of specific foldable tables having at least one leg member, at least one support member, and at least one tabletop member. However, this is merely exemplary and various other foldable tables having at least one leg member, at least one support member, and at least one tabletop member may be utilized as appropriate to the requirements of a specific application in accordance with various embodiments of the invention. After considering this discussion, and particularly after reading the section entitled "Detailed Description," one will understand how the features of the present embodiments provide the advantages described here.

In a first aspect, a foldable table for ready assembly may comprise a first leg member for providing support, wherein the first leg member may comprise an outer leg portion that includes a left outer slit and a right outer slit and an inner leg portion that includes a left inner slit and right inner slit; a second member for providing support, wherein the second leg member may comprise an outer leg portion that includes a left outer slit and a right outer slit and an inner leg portion that includes a left inner slit and a right inner slit; a first tabletop member for providing a surface to the foldable table, wherein the first tabletop member may comprise an outer foldable flap that includes a left outer slit and a right outer slit and an inner foldable flap that includes a left inner slit and a right inner slit; a second tabletop member for providing a surface to the foldable table, wherein the second tabletop member may comprise an outer foldable flap that includes a left outer slit and a right outer slit and an inner foldable flap that includes a left inner slit and a right inner slit; a left support member that may comprise a first support portion and a second support portion, wherein the first support portion of the left support member may comprise a first upward facing outer tabletop slit, a first upward facing inner tabletop slit, a first downward facing outer leg slit, and a first downward facing, and wherein the second support portion of the left support member may comprise a second upward facing outer tabletop slit, a second upward facing inner tabletop slit, a second downward facing outer leg slit, and a second downward facing inner leg slit; a right support member that may comprise a first support portion and a second support portion, wherein the first support portion of the right support member may comprise a first upward facing outer tabletop slit, a first upward facing inner tabletop slit, a first downward facing outer leg slit, and a first downward facing inner leg slit, and wherein the second support portion may comprise a second upward facing outer tabletop slit, a second upward facing inner tabletop slit, a second downward facing outer leg slit, and a second downward facing inner leg slit.

In an embodiment of the first aspect, the first leg member, the second leg member, the first tabletop member, the second tabletop member, the left support member, and the right support member may be made of recyclable cardboard.

In another embodiment of the first aspect, both the first leg and the second leg members may include two halves that are each quadrilateral in shape, and both the first leg and the second leg members may be configured to fold at a leg folding line, dividing the first leg and the second leg members into two symmetrical leg portions, including the outer leg portion and the inner leg portion.

In another embodiment of the first aspect, the outer leg portion of the first leg member and the outer leg portion of the second leg member may have identical dimensions and may connect both the first leg and the second leg members to both the right support and the left support members.

In another embodiment of the first aspect, the inner leg portion of the first leg member and the inner leg portion of the second leg member may have identical dimensions and may connect both the first leg and the second leg members to both the right support and the left support members.

In another embodiment of the first aspect, the first tabletop member and the second tabletop member may be rectangular in shape.

In another embodiment of the first aspect, the left outer slit, the right outer slit, the left inner slit, and the right inner slit of both the first tabletop and the second tabletop members may have identical dimensions.

In another embodiment of the first aspect, the first upward facing outer tabletop slit and the second upward facing outer tabletop slit of both the left support and the right support members may have identical dimensions.

In another embodiment of the first aspect, the first upward facing inner tabletop slit and the second upward facing inner tabletop slit of both the left support and the right support members may have identical dimensions of 1.90" long×0.5" wide.

In another embodiment of the first aspect, the first downward facing outer leg slit and the second downward facing outer leg slit of both the left support and the right support members may have identical dimensions.

In another embodiment of the first aspect, the first downward facing inner leg slit and the second downward facing inner leg slit of both the left support and the right support members may have identical dimensions.

In a second aspect, a method for creating a foldable table for ready assembly may comprise placing a left support member on the ground, the left support member comprising upward facing tabletop slits that may include a first upward facing outer tabletop slit, a first upward facing inner tabletop slit, a second upward facing outer tabletop slit, a second upward facing inner tabletop, and downward facing leg slits that may include a first downward facing outer leg slit, a first downward facing inner leg slit, a second downward facing outer leg slit, and a second downward facing inner leg slit, such that the upward facing tabletop slits are face down to the ground and the downward facing leg slits are facing upwards; placing a right support member parallel to the left support member on the ground, the right support member comprising upward facing tabletop slits that may include a first upward facing outer tabletop slit, a first upward facing inner tabletop slit, a second upward facing outer tabletop slit, a second upward facing inner tabletop, and downward facing leg slits that may include a first downward facing outer leg slit, a first downward facing inner leg slit, a second downward facing outer leg slit, and a second downward facing inner leg slit, such that the upward facing tabletop slits are face down to the ground and the downward facing leg slits are facing upwards; attaching a first leg member to the left support member and the right support member, wherein the first leg member comprising an outer leg portion that may include a right outer slit and a left outer slit and an inner leg portion that may include a right inner slit and a left inner slit, by slotting the right inner slit to the first downward facing inner leg slit of the right support member, the right outer slit to the first downward facing outer leg slit of the right support member, the left inner slit to the first downward facing inner leg slit of the left support member, and the left outer slit to the first downward facing outer leg slit of the left support member; attaching a second leg member to the left support member and the right support member, wherein the second leg member comprising an outer leg portion that may include a right outer slit and a left outer slit and an inner leg portion that may include a right inner slit and a left inner slit, by slotting the right inner slit to the second downward facing inner leg slit of the right support member, the right outer slit to the second downward facing outer leg slit of the right support member, the left inner slit to the second downward facing inner leg slit of the left support member, and the left outer slit to the second downward facing outer leg slit of the left support member; flipping the left support member and the right support member with the first leg member and the second leg member attached such that the upward facing tabletop slits are facing upwards and the downward facing leg slits are facing down to the ground; attaching a first tabletop member to the left support member and the right support member, wherein the first tabletop member comprising an outer foldable flap that may include a right outer slit and a left outer slit and an inner foldable flap that may include a right inner slit and a left inner slit, by slotting the right inner slit to the first upward facing inner tabletop slit of the right support member, the right outer slit to the first upward facing outer tabletop slit of the right support member, the left inner slit to the first upward facing inner tabletop slit of the left support member, and the left outer slit to the first upward facing outer tabletop slit of the left support member; attaching a second tabletop member to the left support member and the right support member, wherein the second tabletop member comprising an outer foldable flap that may include a right outer slit and a left outer slit and an inner foldable flap that may include a right inner slit and a left inner slit, by slotting the right inner slit to the second upward facing inner tabletop slit of the right support member, the right outer slit to the second upward facing outer tabletop slit of the right support member, the left inner slit to the second upward facing inner tabletop slit of the left support member, and the left outer slit to the second upward facing outer tabletop slit of the left support member.

In an embodiment of the second aspect, the first leg member, the second leg member, the first tabletop member, the second tabletop member, the left support member, and the right support member may be made of recyclable cardboard.

In another embodiment of the second aspect, both the first leg and the second leg members may include two halves that are each quadrilateral in shape, and both the first leg and second leg members may be configured to fold at a leg folding line, dividing the first leg and the second leg members into two symmetrical leg portions, including the outer leg portion and the inner leg portion.

In another embodiment of the second aspect, the left outer slit and the right outer slit of both the first leg and the second leg members may have identical dimensions.

In another embodiment of the second aspect, the left inner slit and the right inner slit of both the first leg and the second leg members may have identical dimensions.

In another embodiment of the second aspect, the first tabletop member and the second tabletop member may be rectangular in shape.

In another embodiment of the second aspect, the left outer slit, the right outer slit, the left inner slit, and the right inner slit of both the first tabletop and the second tabletop members may have identical dimensions.

In another embodiment of the second aspect, the first upward facing outer tabletop slit and the second upward facing outer tabletop slit of both the left support and the right support members have identical dimensions, and the first upward facing inner tabletop slit and the second upward facing inner tabletop slit of both the left support and the right support members may have identical dimensions.

In another embodiment of the second aspect, the first downward facing outer leg slit and the second downward facing outer leg slit of both the left support and the right support members may have identical dimensions, and the first downward facing inner leg slit and the second downward facing inner leg slit of both the left support and the right support members may have identical dimensions.

BRIEF DESCRIPTION OF THE DRAWINGS

The various embodiments of the present foldable table for ready assembly now will be discussed in detail with an emphasis on highlighting the advantageous features. These embodiments depict the novel and non-obvious aspects of the foldable table shown in the accompanying drawings, which are for illustrative purposes only. These drawings include the following figures.

DETAILED DESCRIPTION OF THE DRAWINGS

Figure 1A:
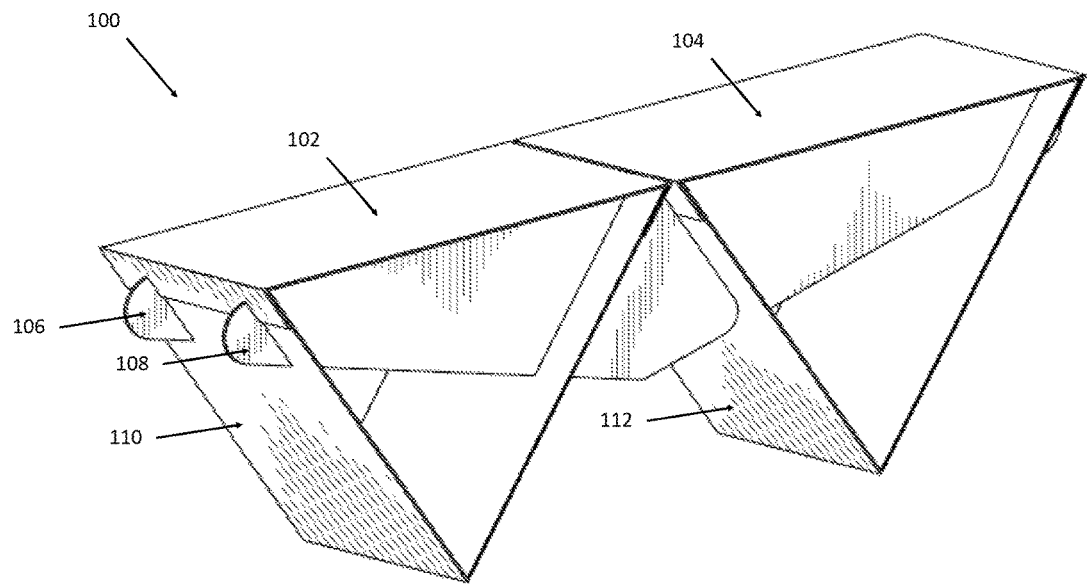
FIG. 1A is a schematic diagram illustrating a perspective view of an assembled foldable table in accordance with an embodiment of the invention.

The following detailed description describes the present embodiments with reference to the drawings. In the drawings, reference numbers label elements of the present embodiments. These reference numbers are reproduced below in connection with the discussion of the corresponding drawing features.

Turning now to the drawings, apparatuses and methods for assembling and disassembling foldable tables in accordance with embodiments of the invention are illustrated. In many embodiments, the foldable table is made up of six recyclable cardboard pieces (may also be referred to as "members") that flat-pack into a box for portability and storage and are unboxed and unfolded for assembly. In various embodiments, the six individual pieces become legs, tabletops, and support members as further described below. The ability to unfold a large table out of a small box may provide advantages because of the wider range of places in which it can be used and the ease of accessibility in which it provides. Further, in embodiments where the members are made from recyclable material makes the lifespan and usage of the invention up to the end user. For example, if the usage is temporary, the invention is easily recyclable. However, if the usage is long term, the invention can easily be folded and stored in a small box. Foldable tables comprising at least one leg member, at least one support member, and at least one tabletop member in accordance with embodiments of the invention are discussed further below.

Assembled Foldable Table

A schematic diagram illustrating a perspective view of an assembled foldable table 100 in accordance with an embodiment of the invention is shown in FIG. 1A. In many embodiments, the assembled foldable table 100 may comprise at least one leg member, at least one support member, and at least one tabletop member. For example, in some embodiments, the assembled foldable table 100 may comprise a first leg member 110, a second leg member 112, a first tabletop member 102, a second tabletop member 104, a left support member 106, and a right support member 108. In many embodiments, various members may comprise a plurality of slits that allow members to slot together at specified locations to form the assembled foldable table 100, as further described below.

In some embodiments, the members may comprise foldable flaps that allow for slotting with other members to form the assembled foldable table 100. In many embodiments, the various members may be slotted together into the assembled foldable table 100 without any additional hardware (e.g., tape, glue, staples, etc.) other than the various members. In some embodiments, the members are made of recyclable cardboard.

In various embodiments, the assembled foldable table 100 may comprise the first tabletop member 102 and the second tabletop member 104. In some embodiments, the first tabletop member 102 and the second tabletop member 104 may be identical. For example, the first tabletop member 102 and the second tabletop member 104 may be rectangular shaped. In some embodiments, the first tabletop member 102 and a second tabletop member 104 may comprise flaps on opposite ends of the tabletop member for slotting with other members. The flaps may comprise slits for slotting with other members. In various embodiments, the first tabletop member 102 and the second tabletop member 104 may comprise flaps and slits that are enabled to slot into various other members in order to form an assembled foldable table, as further described below.

In many embodiments, the assembled foldable table 100 may comprise the first leg member 110 and the second leg member 112. In some embodiments, the first leg member 110 and the second leg member 112 may be identical. In some embodiments, the first leg member 110 and the second leg member 112 may each comprise of two quadrilateral halves when unfolded. In various embodiments, the first leg member 110 and the second leg member 112 may be configured to fold in half.

In some embodiments, the first leg member 110 and the second leg member 112 may comprise slits for slotting with other members. For example, the first leg member 110 and the second leg member 112 may be symmetrical such that slits on an outer half of the leg member mirror the slits on an inner half of the leg member. For example, in various embodiments, when the first leg member 110 or the second leg member 112 is fully folded in half, the slits may match.

In some embodiments, the first leg member 110 or the second leg member 112 may be configured to slot with other members to form the assembled foldable table 100. In various embodiments, the first leg member 110 or the second leg member 112 may be configured to slot together with other members when the first leg member 110 and the second leg member 112 are partially folded, for example into a V shape. Slotting the first leg member 110 and the second leg member 112 to the other members in a partially folded position may provide increased stability and support to the assembled foldable table 100.

In some embodiments, the assembled foldable table 100 may comprise the left support member 106 and the right support member 108. In some embodiments, the left support member 106 and the right support member 108 may be identical. In various embodiments, the left support member 106 and the right support member 108 may be configured to fold in half such that the halves of the support member match.

In some embodiments, the left support member 106 and the right support member 108 may comprise slits for slotting with other members. In some embodiments, a first half and a second half of the left support member 106 and the right support member 108 may be symmetrical. For example, the left support member 106 and the right support member 108 may be symmetrical such that slits on a first half of the support member mirror the slits on a second half of the support member. For example, in various embodiments, when the left support member 106 or the right support member 108 is fully folded in half, the slits may match.

In some embodiments, the left support member 106 and the right support member 108 may be configured to slot with other members to form the assembled foldable table 100. In various embodiments, the left support member 106 or the right support member 108 may be configured to slot together with other members when they are unfolded such that the left support member 106 and the right support member 108 could lie flat on the ground. For example, when positioned to slot with other members to form the assembled foldable table 100, the left support member 106 and the right support member 108 may be configured such that the first half and the second half of each support member is coplanar.

Figure 1B:
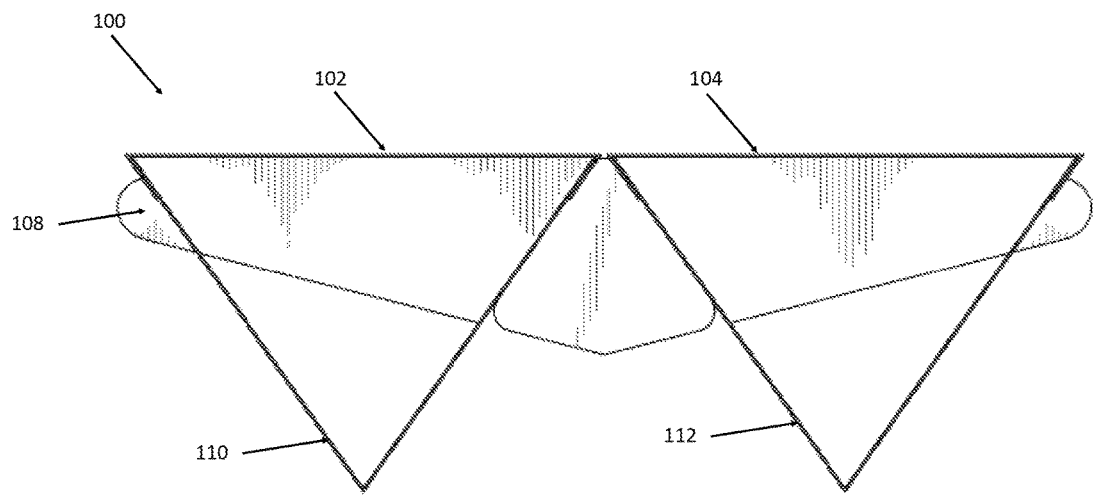
FIG. 1B is a schematic diagram illustrating a right side view of an assembled foldable table in accordance with an embodiment of the invention.

A schematic diagram illustrating a right side view of the assembled foldable table 100 in accordance with an embodiment of the invention is shown in FIG. 1B. As described above in relation to FIG. 1A, the first leg member 110, the second leg member 112, the first tabletop member 102, the second tabletop member 104, and the right support member 108 may be seen when viewing the assembled foldable table 100 from a right side view.

Figure 1C:
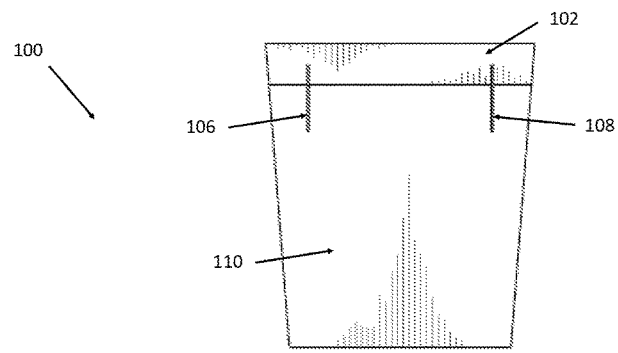
FIG. 1C is a schematic diagram illustrating an end view of an assembled foldable table in accordance with an embodiment of the invention.

A schematic diagram illustrating an end view of the assembled foldable table 100 in accordance with an embodiment of the invention is shown in FIG. 1C. As described above in relation to FIG. 1A, the first leg member 110, the first tabletop member 102, the left support member 106, and the right support member 108 may be seen when viewing the assembled foldable table 100 from an end view.

Figure 1D:
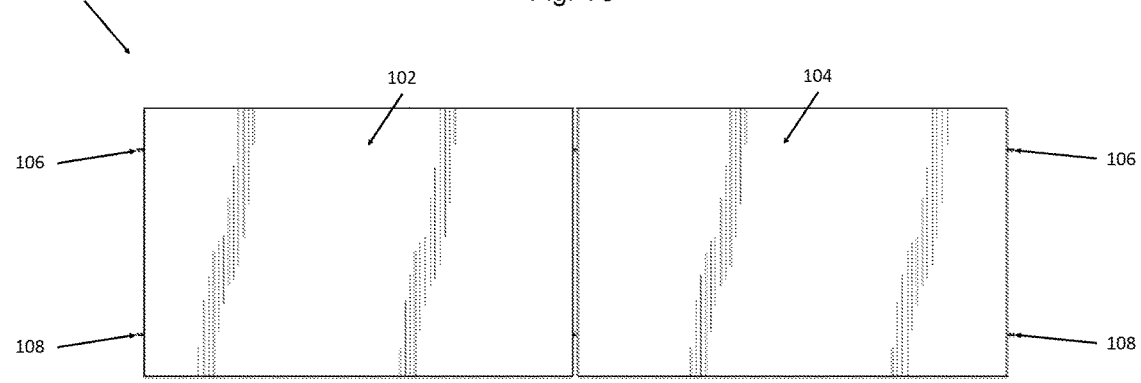
FIG. 1D is a schematic diagram illustrating a top view of an assembled foldable table in accordance with an embodiment of the invention.

A schematic diagram illustrating a top view of the assembled foldable table 100 in accordance with an embodiment of the invention is shown in FIG. 1D. As described above in relation to FIG. 1A, the first tabletop member 102, the second tabletop member 104, the left support member 106, and the right support member 108 may be seen when viewing the assembled foldable table 100 from a top view.

Figure 1E:
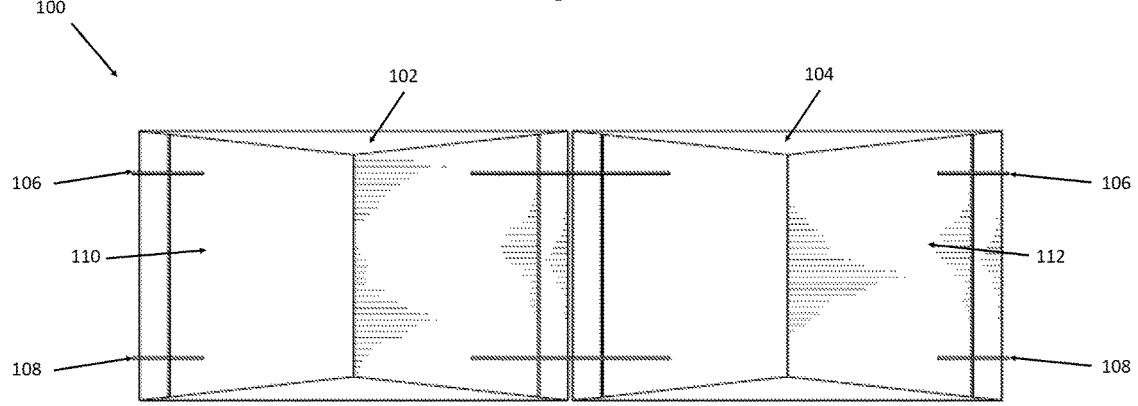
FIG. 1E is a schematic diagram illustrating a bottom view of an assembled foldable table in accordance with an embodiment of the invention.

A schematic diagram illustrating a bottom view of the assembled foldable table 100 in accordance with an embodiment of the invention is shown in FIG. 1E. As described above in relation to FIG. 1A, the first leg member 110, the second leg member 112, the first tabletop member 102, the second tabletop member 104, the left support member 106, and the right support member 108 may be seen when viewing the assembled table 100 from a bottom view.

Although specific foldable tables having at least one leg member, at least one support member, and at least one tabletop member are described above with respect to FIG. 1A-1E, any of a variety of foldable tables having at least one leg member, at least one support member, and at least one tabletop member as appropriate to the requirements of a specific application can be utilized in accordance with embodiments of the invention. Members of foldable tables comprising at least one leg member, at least one support member, and at least one tabletop member in accordance with embodiments of the invention are discussed further below.

Members of a Foldable Table

As stated above, in many embodiments, a foldable table in accordance with embodiments of the invention may comprise at least one tabletop member, at least one leg member, and at least one support member. Exemplary tabletop members, exemplary leg members, and exemplary support members are described in greater detail below.

First Tabletop Member of a Foldable Table

Figure 3A:
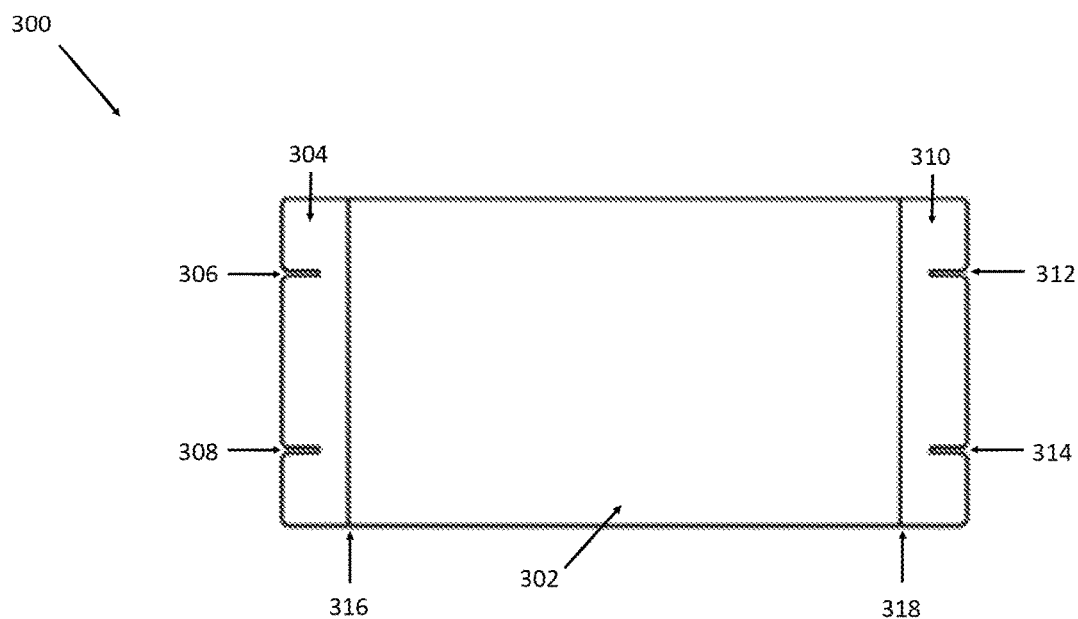
FIG. 3A is a schematic diagram illustrating a first tabletop member of a foldable table in accordance with an embodiment of the invention.

As schematic diagram illustrating a first tabletop member of a foldable table in accordance with an embodiment of the invention is shown in FIG. 3A. In various embodiments, a first tabletop member 300 may comprise a surface portion, at least one flap portion, and as least one slit. In various embodiments, the first tabletop member 300 is rectangular with dimensions of 24" long×51.51" wide.

In many embodiments, the first tabletop member 300 may comprise a tabletop surface portion 302. The tabletop surface portion 302 may be suitable for use in various contexts. For example, a vendor may place merchandise on the tabletop surface portion 302. In various embodiments, the tabletop surface portion 302 may be rectangular in shape.

In various embodiments, the first tabletop member 300 may further comprise foldable flaps that allow for slotting with other members to form an assembled foldable table. In some embodiments, an outer flap 304 may be attached to the tabletop surface portion 302, and an inner flap 310 may be attached to the tabletop surface portion 302.

In many embodiments, the first tabletop member 300 may comprise one or more slits for slotting with other members to form an assembled foldable table. In some embodiments, the outer flap 304 may comprise a plurality of slits. For example, the outer flap 304 may comprise a left outer slit 306 and a right outer slit 308. In some embodiments, the left outer slit 306 and the right outer slit 308 have dimensions of 2.75" long×0.5" wide. In other embodiments, the left outer slit 306 and the right outer slit 308 have dimensions of 2.75" long×0.25" wide. In some embodiments, the inner flap 310 may comprise a plurality of slits. For example, the inner flap 310 may comprise a left inner slit 312 and a right inner slit 314. In some embodiments, the left inner slit 312 and the right inner slit 314 have dimensions of 2.75" long×0.5" wide. In other embodiments, the left inner slit 312 and the right inner slit 314 have dimensions of 2.75" long×0.25" wide. In some embodiments, the flaps 304 and 310 may be symmetrical. An outer flap folding line 316 and an inner flap folding line 318 demarcate the outer flap 304 and the inner flap 310, respectively.

Second Tabletop Member of a Foldable Table

Figure 3B:
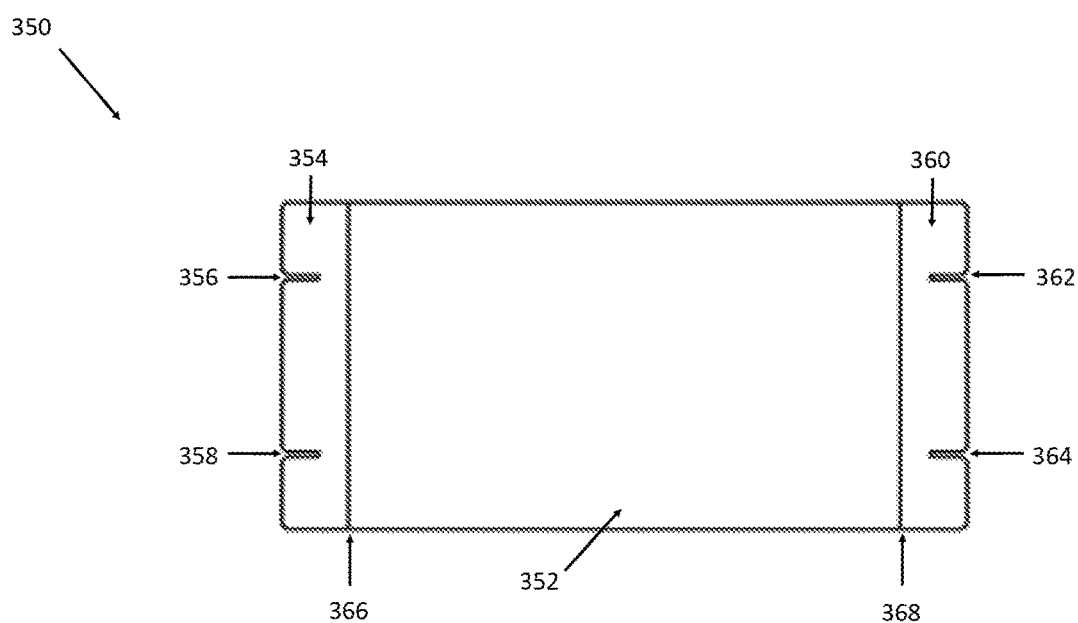
FIG. 3B is a schematic diagram illustrating a second tabletop member of a foldable table in accordance with an embodiment of the invention.

A schematic diagram illustrating a second tabletop member of a foldable table in accordance with an embodiment of the invention is shown in FIG. 3B. In various embodiments, a second tabletop member 350 may comprise a surface portion, at least one flap portion, and as least one slit. In various embodiments, the second tabletop member 350 is rectangular with dimensions of 24" long×51.51" wide.

In many embodiments, the second tabletop member 350 may comprise a tabletop surface portion 352. The tabletop surface portion 352 may be suitable for use in various contexts. For example, a vendor may place merchandise on the tabletop surface portion 352. In various embodiments, the tabletop surface portion 352 may be rectangular in shape.

In various embodiments, the second tabletop member 350 may further comprise foldable flaps that allow for slotting with other members to form an assembled foldable table. In some embodiments, an inner flap 354 may be attached to the tabletop surface portion 352, and an outer flap 360 may be attached to the tabletop surface portion 352.

In many embodiments, the second tabletop member 350 may comprise one or more slits for slotting with other members to form an assembled foldable table. In some embodiments, the inner flap 354 may comprise a plurality of slits. For example, the inner flap 354 may comprise a left inner slit 356 and a right inner slit 358. In some embodiments, the left inner slit 356 and the right inner slit 358 have dimensions of 2.75" long×0.5" wide. In other embodiments, the left inner slit 356 and the right inner slit 358 have dimensions of 2.75" long×0.25" wide. In some embodiments, the outer flap 360 may comprise a plurality of slits. For example, the outer flap 360 may comprise a left outer slit 362 and a right outer slit 364. In some embodiments, the left outer slit 362 and the right outer slit 364 have dimensions of 2.75" long×0.5" wide. In other embodiments, the left outer slit 362 and the right outer slit 364 have dimensions of 2.75" long×0.25" wide. In some embodiments, the flaps 354 and 360 may be symmetrical. An inner flap folding line 366 and an outer flap folding line 368 demarcate the inner flap 354 and the outer flap 360, respectively.

Although specific tabletop members for foldable tables having at least one leg member, at least one support member, and at least one tabletop member are described above with respect to FIG. 3A-B, any of a variety of tabletop members for foldable tables having at least one leg member, at least one support member, and at least one tabletop member as appropriate to the requirements of a specific application can be utilized in accordance with embodiments of the invention. An exemplary leg member of a foldable tables comprising at least one leg member, at least one support member, and at least one tabletop member in accordance with embodiments of the invention are discussed further below.

First Leg Member of a Foldable Table

Figure 4A:
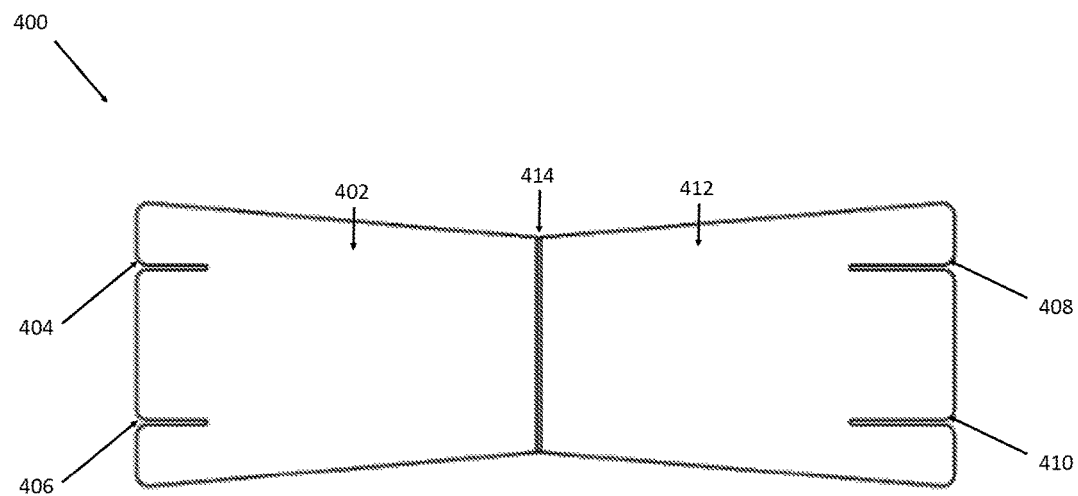
FIG. 4A is a schematic diagram illustrating a first leg member of a foldable table in accordance with an embodiment of the invention.

A schematic diagram illustrating a first leg member of a foldable table in accordance with an embodiment of the invention is shown in FIG. 4A. In various embodiments, a first leg member 400 may have two halves that are quadrilateral in shape and together have total dimensions of 24" long×72.5" wide. In various embodiments, the first leg member 400 may be configured to fold at a leg folding line 414. In some embodiments, the leg folding line 414 divides the first leg member 400 into two symmetrical leg portions. For example, an outer leg portion 402 and an inner leg portion 412 may have identical dimensions.

In many embodiments, the outer leg portion 402 and the inner leg portion 412 of the first leg member 400 may comprise one or more slits for slotting with other members to form an assembled foldable table. In some embodiments, the outer leg portion 402 and the inner leg portion 412 may comprise a plurality of slits for connecting to a left support member. For example, the outer leg portion 402 may comprise a left outer slit 404 and the inner leg portion 412 may comprise a left inner slit 408. In some embodiments, the outer leg portion 402 and the inner leg portion 412 may also comprise a plurality of slits for connecting to a right support member. For example, the outer leg portion 402 may comprise a right outer slit 406 and the inner leg portion 412 may comprise a right inner slit 410.

In some embodiments, the left inner slit 408 and the right inner slit 410 have the same dimensions. In some embodiments, the left inner slit 408 and the right inner slit 410 are 8.5" long×0.5" wide. In other embodiments, the left inner slit 408 and the right inner slit 410 are 8.5" long×0.25" wide. In some embodiments, the left outer slit 404 and the right outer slit 406 have the same dimensions. In some embodiments, the left outer slit 404 and the right outer slit 406 are 6" long×0.5" wide. In other embodiments, the left outer slit 404 and the right outer slit 406 are 6" long×0.25" wide. In various embodiments, the outer leg portion 402 and the inner leg portion 412 of the first leg member 400 may be symmetrical. For example, when the first leg member 400 is fully folded at the leg folding line 414, the left outer slit 404 may match up with the left inner slit 408, and the right outer slit 406 may match up with the right inner slit 410.

Second Leg Member of a Foldable Table

Figure 4B:
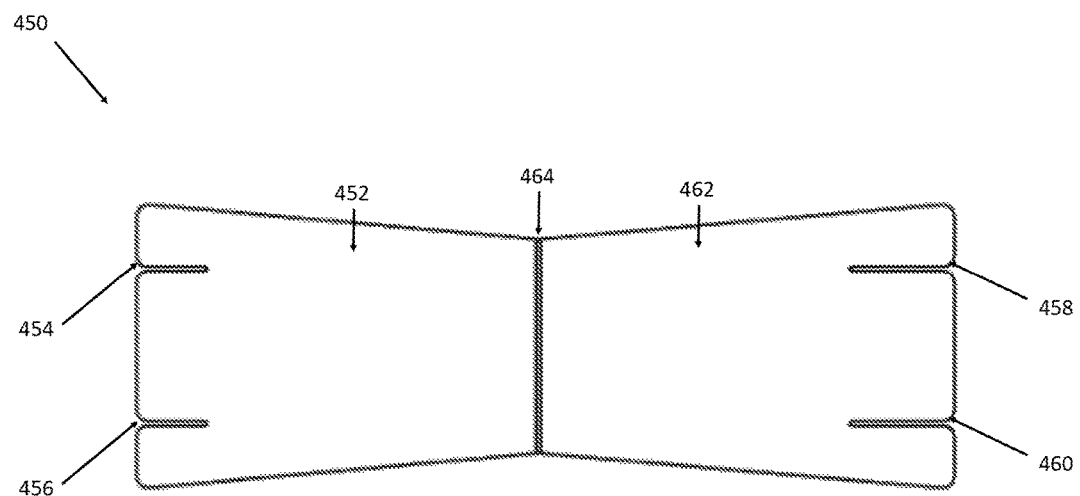
FIG. 4B is a schematic diagram illustrating a second leg member of a foldable table in accordance with an embodiment of the invention.

A schematic diagram illustrating a second leg member of a foldable table in accordance with an embodiment of the invention is shown in FIG. 4B. In various embodiments, a second leg member 450 may have two halves that are quadrilateral in shape and together have total dimensions of 24" long×72.5" wide. In various embodiments, the second leg member 450 may be configured to fold at a leg folding line 464. In some embodiments, the leg folding line 464 divides the second leg member 450 into two symmetrical leg portions. For example, an inner leg portion 452 and an outer leg portion 462 may have identical dimensions.

In many embodiments, the inner leg portion 452 and the outer leg portion 462 of the second leg member 450 may comprise one or more slits for slotting with other members to form an assembled foldable table. In some embodiments, the inner leg portion 452 and the outer leg portion 462 may comprise a plurality of slits for connecting to a left support member. For example, the outer leg portion 462 may comprise a left outer slit 458 and the inner leg portion 452 may comprise a left inner slit 454. In some embodiments, the outer leg portion 462 and the inner leg portion 452 may also comprise a plurality of slits for connecting to a right support member. For example, the outer leg portion 462 may comprise a right outer slit 460 and the inner leg portion 452 may comprise a right inner slit 456.

In some embodiments, the left inner slit 454 and the right inner slit 456 have the same dimensions. In some embodiments, the left inner slit 454 and the right inner slit 456 are 8.5" long×0.5" wide. In other embodiments, the left inner slit 454 and the right inner slit 456 are 8.5" long×0.25" wide. In some embodiments, the left outer slit 458 and the right outer slit 460 have the same dimensions. In some embodiments, the left outer slit 458 and the right outer slit 460 are 6" long×0.5" wide. In other embodiments, the left outer slit 458 and the right outer slit 460 are 6" long×0.25" wide. In various embodiments, the outer leg portion 462 and the inner leg portion 452 of the second leg member 450 may be symmetrical. For example, when the second leg member 450 is fully folded at the leg folding line 464, the left outer slit 458 may match up with the left inner slit 454, and the right outer slit 460 may match up with the right inner slit 456.

Although specific leg members of foldable tables comprising at least one leg member, at least one support member, and at least one tabletop member above with respect to FIG. 4A-B, any of a variety of leg members of foldable tables comprising at least one leg member, at least one support member, and at least one tabletop member as appropriate to the requirements of a specific application can be utilized in accordance with embodiments of the invention. An exemplary support member of a foldable tables comprising at least one leg member, at least one support member, and at least one tabletop member in accordance with embodiments of the invention are discussed further below.

Left Support Member of a Foldable Table

Figure 5A:
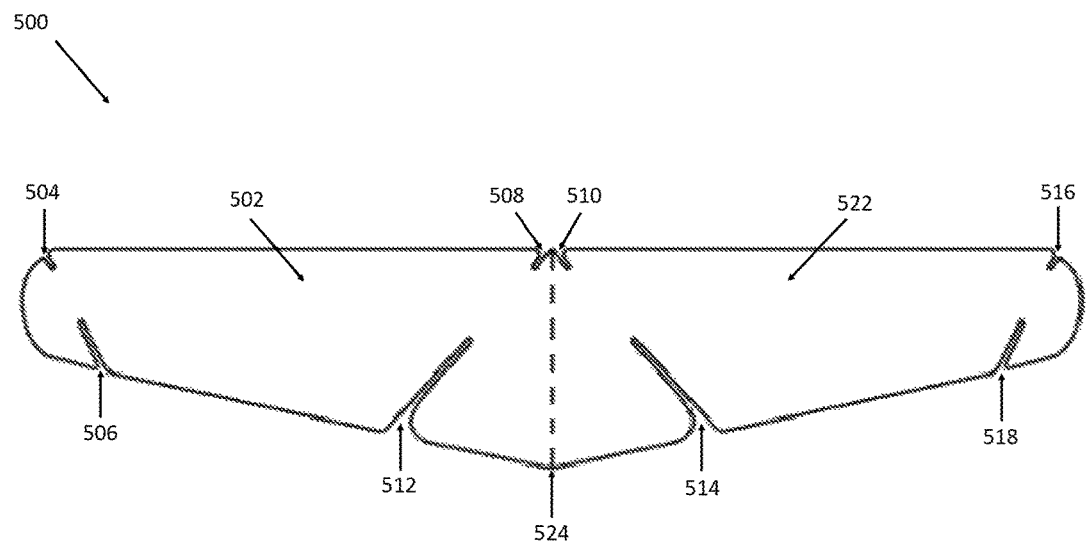
FIG. 5A is a schematic diagram illustrating a left support member of a foldable table in accordance with an embodiment of the invention.

A schematic diagram illustrating a left support member of a foldable table in accordance with an embodiment of the invention is shown in FIG. 5A. In various embodiments, a left support member 500 may be configured to fold at a left support member folding line 524. In some embodiments, the left support member folding line 524 divides the left support member 500 into two symmetrical support portions. For example, a first support portion 502 and a second support portion 522 of the left support member 500 may have identical dimensions.

In many embodiments, the first support portion 502 and the second support portion 522 of the left support member 500 may comprise a plurality of slits for slotting with other members to form an assembled foldable table.

In some embodiments, the left support member 500 may comprise upward facing slits to connect with the tabletop members. For example, the first support portion 502 may comprise a first upward facing outer tabletop slit 504 and a first upward facing inner tabletop slit 508 for slotting with the outer and inner left slits on a first tabletop member, respectively. Further, the second support portion 522 may comprise a second upward facing inner tabletop slit 510 and a second upward facing outer tabletop slit 516 for slotting with the inner and outer left slits on a second tabletop member, respectively. In some embodiments, the first upward facing outer tabletop slit 504 and the second upward facing outer tabletop slit 516 have identical dimensions. In some embodiments, the first upward facing outer tabletop slit 504 and the second upward facing outer tabletop slit 516 have dimensions of 1.25" long×0.5" wide. In other embodiments, the first upward facing outer tabletop slit 504 and the second upward facing outer tabletop slit 516 have dimensions of 1.25" long×0.25" wide. In some embodiments, the first upward facing inner tabletop slit 508 and the second upward facing inner tabletop slit 510 have identical dimensions. In some embodiments, the first upward facing inner tabletop slit 508 and the second upward facing inner tabletop slit 510 have dimensions of 1.90" long×0.5" wide. In other embodiments, the first upward facing inner tabletop slit 508 and the second upward facing inner tabletop slit 510 have dimensions of 1.90" long×0.25" wide.

In various embodiments, the left support member 500 may further comprise downward facing slits to connect with the leg members. For example, the first support portion 502 may comprise a first downward facing outer leg slit 506 and a first downward facing inner leg slit 512 for slotting with the outer and inner left slits on a first leg member, respectively. Further, the second support portion 522 may comprise a second downward facing inner leg slit 514 and a second downward facing outer leg slit 518 for slotting with the inner and outer left slits on a second leg member, respectively. In some embodiments, the first downward facing outer leg slit 506 and the second downward facing outer leg slit 518 have identical dimensions. In some embodiments, the first downward facing outer leg slit 506 and the second downward facing outer leg slit 518 have dimensions of 3.50" long×0.5" wide. In other embodiments, the first downward facing outer leg slit 506 and the second downward facing outer leg slit 518 have dimensions of 3.50" long×0.25" wide. In some embodiments, the first downward facing inner leg slit 512 and the second downward facing inner leg slit 514 have identical dimensions. In some embodiments, the first downward facing inner leg slit 512 and the second downward facing inner leg slit 514 have dimensions of 9.25" long×0.5" wide. In other embodiments, the first downward facing inner leg slit 512 and the second downward facing inner leg slit 514 have dimensions of 9.25" long×0.25" wide.

Right Support Member of a Foldable Table

Figure 5B:
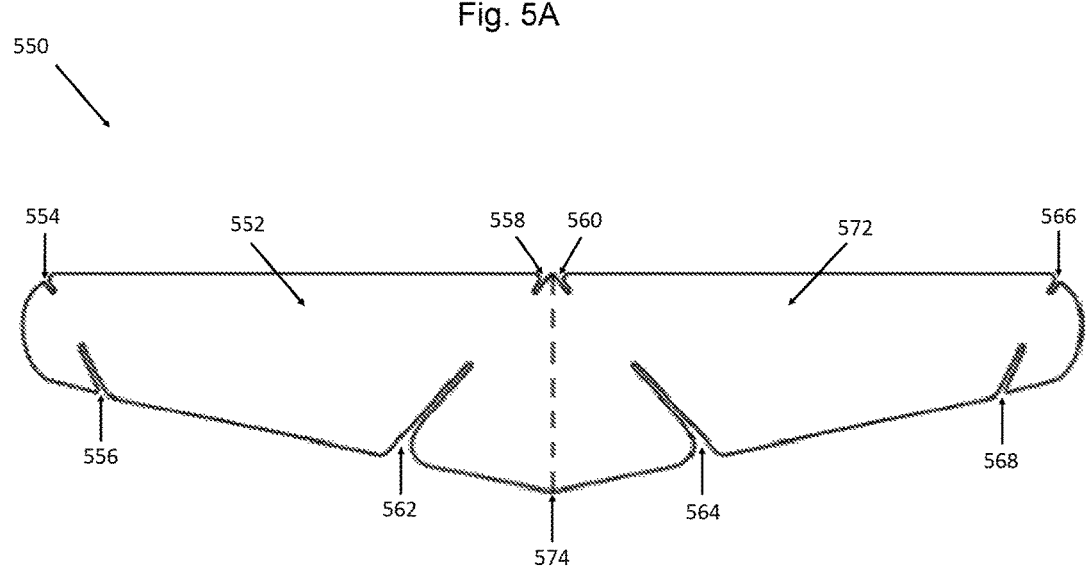
FIG. 5B is a schematic diagram illustrating a right support member of a foldable table in accordance with an embodiment of the invention.

A schematic diagram illustrating a right support member of a foldable table in accordance with an embodiment of the invention is shown in FIG. 5B. In various embodiments, a right support member 550 may be configured to fold at a right support member folding line 574. In some embodiments, the right support member folding line 574 divides the right support member 550 into two symmetrical support portions. For example, a first support portion 552 and a second support portion 572 of the right support member 550 may have identical dimensions.

In many embodiments, the first support portion 552 and the second support portion 572 of the right support member 550 may comprise a plurality of slits for slotting with other members to form an assembled foldable table.

In some embodiments, the right support member 550 may comprise upward facing slits to connect with the tabletop members. For example, the first support portion 552 may comprise a first upward facing outer tabletop slit 554 and a first upward facing inner tabletop slit 558 for slotting with the outer and inner right slits on a first tabletop member, respectively. Further, the second support portion 572 may comprise a second upward facing inner tabletop slit 560 and a second upward facing outer tabletop slit 566 for slotting with the inner and outer right slits on a second tabletop member, respectively. In some embodiments, the first upward facing outer tabletop slit 554 and the second upward facing outer tabletop slit 566 have identical dimensions. In some embodiments, the first upward facing outer tabletop slit 554 and the second upward facing outer tabletop slit 566 have dimensions of 1.25" long×0.5" wide. In other embodiments, the first upward facing outer tabletop slit 554 and the second upward facing outer tabletop slit 566 have dimensions of 1.25" long×0.25" wide. In some embodiments, the first upward facing inner tabletop slit 558 and the second upward facing inner tabletop slit 560 have identical dimensions. In some embodiments, the first upward facing inner tabletop slit 558 and the second upward facing inner tabletop slit 560 have dimensions of 1.90" long×0.5" wide. In other embodiments, the first upward facing inner tabletop slit 558 and the second upward facing inner tabletop slit 560 have dimensions of 1.90" long×0.25" wide.

In various embodiments, the right support member 550 may further comprise downward facing slits to connect with the leg members. For example, the first support portion 552 may comprise a first downward facing outer leg slit 556 and a first downward facing inner leg slit 562 for slotting with the outer and inner left slits on a first leg member, respectively. Further, the second support portion 572 may comprise a second downward facing inner tabletop slit 564 and a second downward facing outer tabletop slit 568 for slotting with the inner and outer left slits on a second leg member, respectively. In some embodiments, the first outer downward facing slit 556 and the second downward facing outer tabletop slit 568 have identical dimensions. In some embodiments, the first downward facing outer leg slit 556 and the second downward facing outer tabletop slit 568 have dimensions of 3.50" long×0.5" wide. In other embodiments, the first downward facing outer leg slit 556 and the second downward facing outer tabletop slit 568 have dimensions of 3.50" long×0.25" wide. In some embodiments, the first downward facing inner leg slit 562 and the second downward facing inner tabletop slit 564 have identical dimensions. In some embodiments, the first downward facing inner leg slit 562 and the second downward facing inner tabletop slit 564 have dimensions of 9.25" long×0.5" wide. In other embodiments, the first downward facing inner leg slit 562 and the second downward facing inner tabletop slit 564 have dimensions of 9.25" long×0.25" wide.

Although specific support members of a foldable tables comprising at least one leg member, at least one support member, and at least one tabletop member above with respect to FIG. 5A-B, any of a variety of support members of a foldable tables comprising at least one leg member, at least one support member, and at least one tabletop member as appropriate to the requirements of a specific application can be utilized in accordance with embodiments of the invention. The disassembled members of a foldable table in accordance with embodiments of the invention are discussed further below.

Disassembled Members of a Foldable Table

Figure 2:
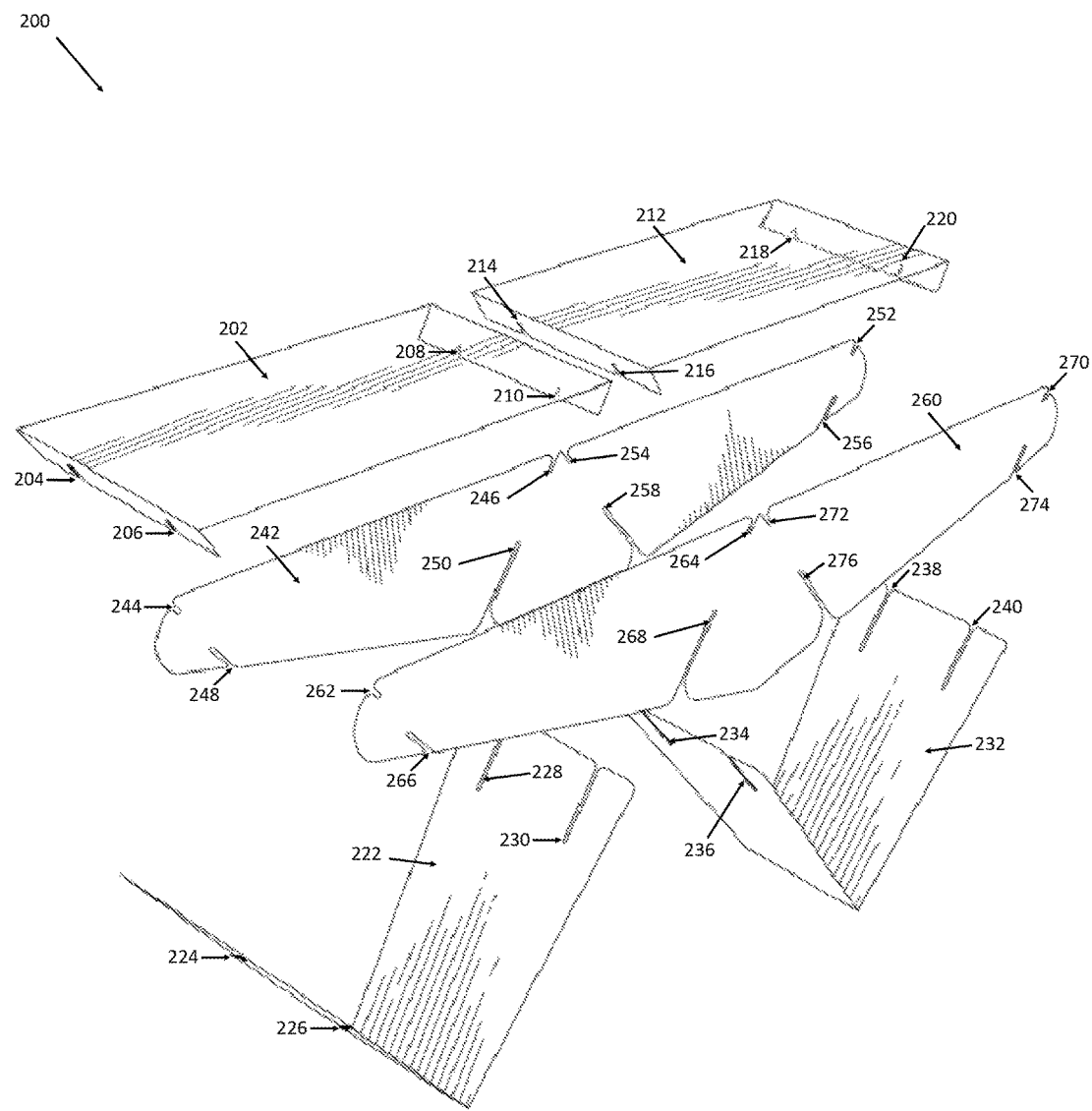
FIG. 2 is a schematic diagram illustrating a perspective view of the members of a disassembled foldable table in accordance with an embodiment of the invention.

A schematic diagram illustrating a perspective view of the disassembled members 200 of a foldable table in accordance with an embodiment of the invention is shown in FIG. 2. In many embodiments, the disassembled members 200 may comprise a first tabletop member 202, a second tabletop member 212, a first leg member 222, a second leg member 232, a left support member 242, and a right support member 260. In many embodiments, the disassembled members 200 may be assembled to form a foldable table in accordance with an embodiment of this invention.

In many embodiments, the first tabletop member 202 may be slotted with the support members 242 and 260. In some embodiments, the first tabletop member 202 may be slotted with the left support member 242. For example, a left outer slit 204 on the first tabletop member 202 may be slotted with a first upward facing outer tabletop slit 244 on left support member 242, and a left inner slit 208 on the first tabletop member 202 may be slotted with a first upward facing inner tabletop slit 246 on the left support member 242. In various embodiments, the first tabletop member 202 may be slotted with the right support member 260. For example, a right outer slit 206 on the first tabletop member 202 may be slotted with first upward facing outer tabletop slit 262 on the right support member 260, and a right inner slit 210 on the first tabletop member 202 may be slotted with a first upward facing inner tabletop slit 264 on the right support member 260.

In many embodiments, the second tabletop member 212 may be slotted with the support members 242 and 260. In some embodiments, the second tabletop member 212 may be slotted with the left support member 242. For example, a left outer slit 218 on the second tabletop member 212 may be slotted with a second upward facing outer tabletop slit 252 on the left support member 242, and a left inner slit 214 on the second tabletop member 212 may be slotted with a second upward facing inner tabletop slit 254 on the left support member 242. In various embodiments, the second tabletop member 212 may be slotted with the right support member 260. For example, a right outer slit 220 on the second tabletop member 212 may be slotted with a second upward facing outer tabletop slit 270 on the right support member 260, and a right inner slit 216 on the second tabletop member 212 may be slotted with a second upward facing inner tabletop slit 272 on the right support member 260.

In many embodiments, the first leg member 222 may be slotted with the support members 242 and 260. In various embodiments, the first leg member 222 may be slotted with the left support member 242. For example, a left outer slit 224 on the first leg member 222 may be slotted with a first downward facing outer leg slit 248 on the left support member 242, and a left inner slit 228 on the first tabletop member 202 may be slotted with a first downward facing inner leg slit 250 on the left support member 242. In some embodiments, the first leg member 222 may be slotted with the right support member 260. For example, a right outer slit 226 on the first leg member 222 may be slotted with a first downward facing outer leg slit 266 on the right support member 260, and a right inner slit 230 on the first leg member 222 may be slotted with a first upward facing inner tabletop slit 268 on the right support member 260.

In many embodiments, the first tabletop member 212 may be slotted with the support members 242 and 260. In some embodiments, the second leg member 232 may be slotted with the left support member 242. For example, a left outer slit 238 on the second leg member 232 may be slotted with a second downward facing outer leg slit 256 on the left support member 242, and a left inner slit 234 on the second tabletop member 232 may be slotted with a second downward facing inner leg slit 258 on the left support member 242. In various embodiments, the second leg member 232 may be slotted with the right support member 260. For example, a right outer slit 240 on the second tabletop member 232 may be slotted with a second downward facing outer tabletop slit 274 on the right support member 260, and a right inner slit 236 on the second tabletop member 232 may be slotted with a second downward facing inner tabletop slit 276 on the right support member 260.

Although specific members of foldable tables are described above with respect to FIG. 2, any of a variety of members of foldable tables comprising at least one leg member, at least one support member, and at least one tabletop member as appropriate to the requirements of a specific application can be utilized in accordance with embodiments of the invention. Methods for assembling a foldable table comprising at least one leg member, at least one support member, and at least one tabletop member in accordance with embodiments of the invention are discussed further below.

Assembling a Foldable Table

Figure 6:
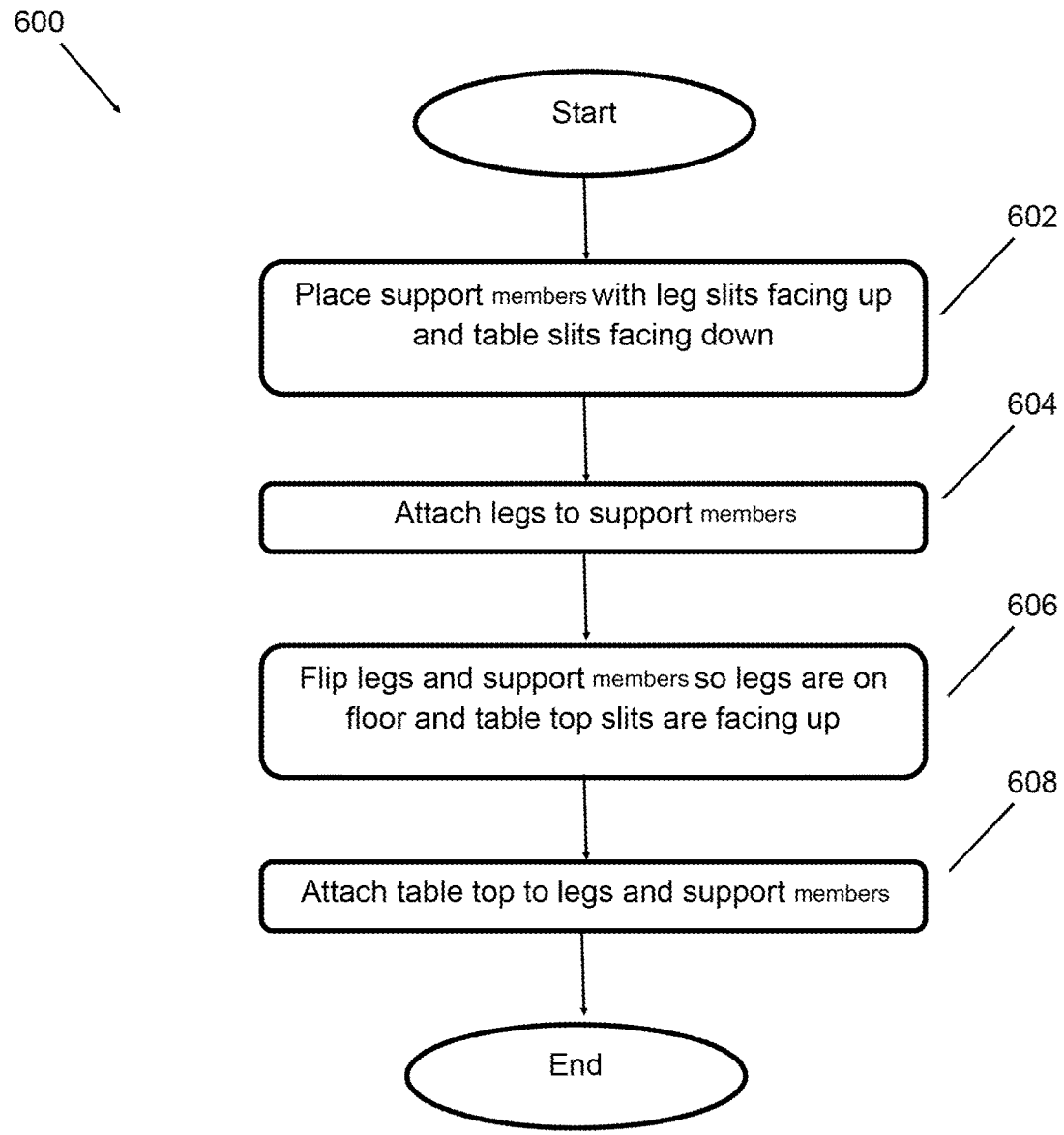
FIG. 6 is a flowchart demonstrating a process for assembling a foldable table in accordance with an embodiment of the invention.

A flowchart demonstrating a process 600 for assembling a foldable table in accordance with an embodiment of the invention is shown in FIG. 6. FIGS. 7A through 7D are schematic diagrams depicting the positioning of various members according to the steps of process 600. In various embodiments, a user may assemble a foldable table comprising at least one leg member, at least one support member, and at least one tabletop member.

Figure 7A:
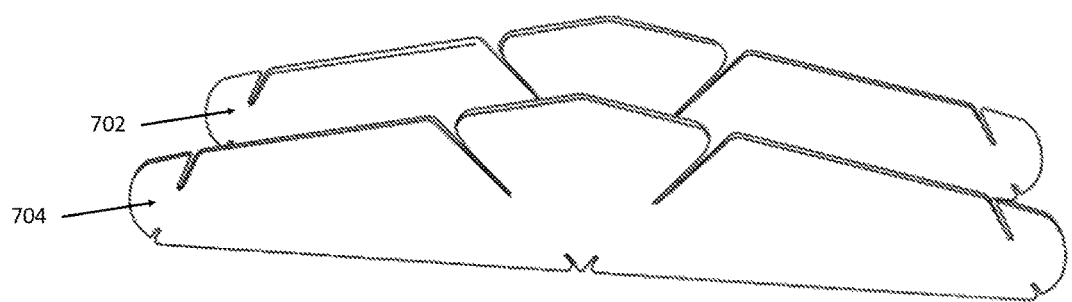
FIG. 7A is a schematic diagram illustrating a perspective view of the left support and the right support members of a foldable table in accordance with an embodiment of the invention.

In many embodiments, in a step 602, the user may place support members on the ground so that other members may be slotted into the support member. In some embodiments, the user may place the support members so the upward facing tabletop slits are face down to the ground, and the downward facing leg slits are facing upwards. For example, in the step 602, the user may place a left support member 702 and a right support member 704 on the ground as shown in FIG. 7A.

Figure 7B:
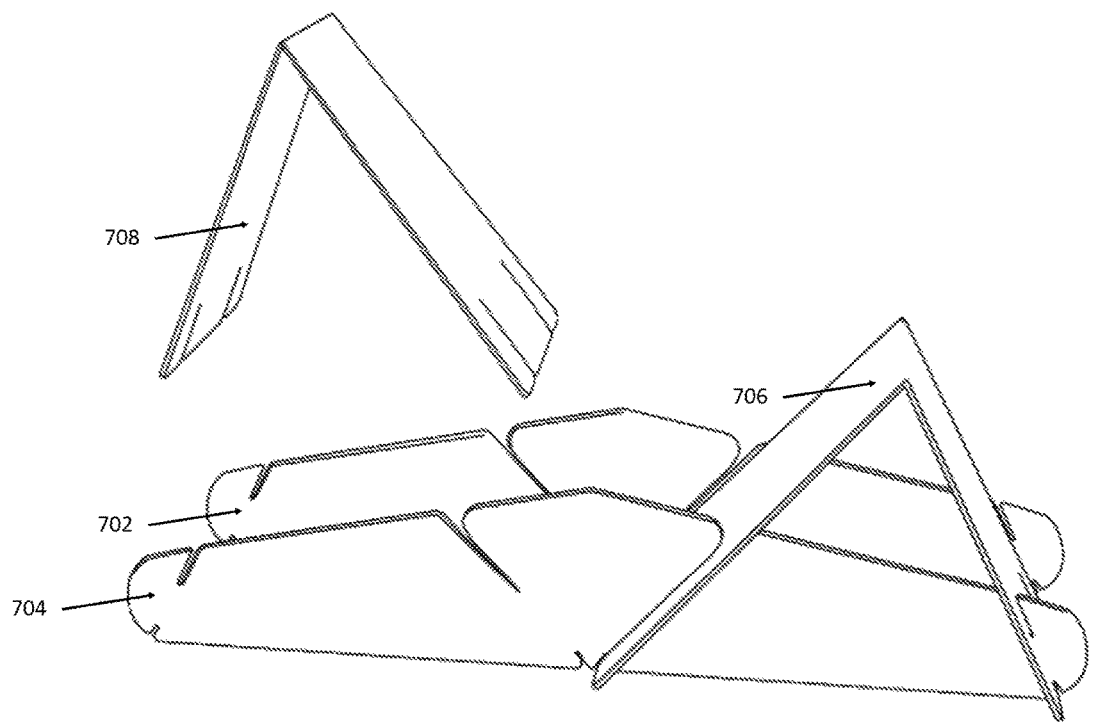
FIG. 7B is a schematic diagram illustrating a perspective view of the first leg and the second leg members and the left support and the right support members of a foldable table when partially slotted in accordance with an embodiment of the invention.

In several embodiments, in a step 604, the user may slot other members to the support members. In some embodiments, the user may first slot the leg members to the support members. For example, in the step 604, the user may slot a first leg member 708 together with the support members 702 and 704, and may slot a second leg member 706 with the support members 702 and 704 as shown in FIG. 7B and described above.

Figure 7C:
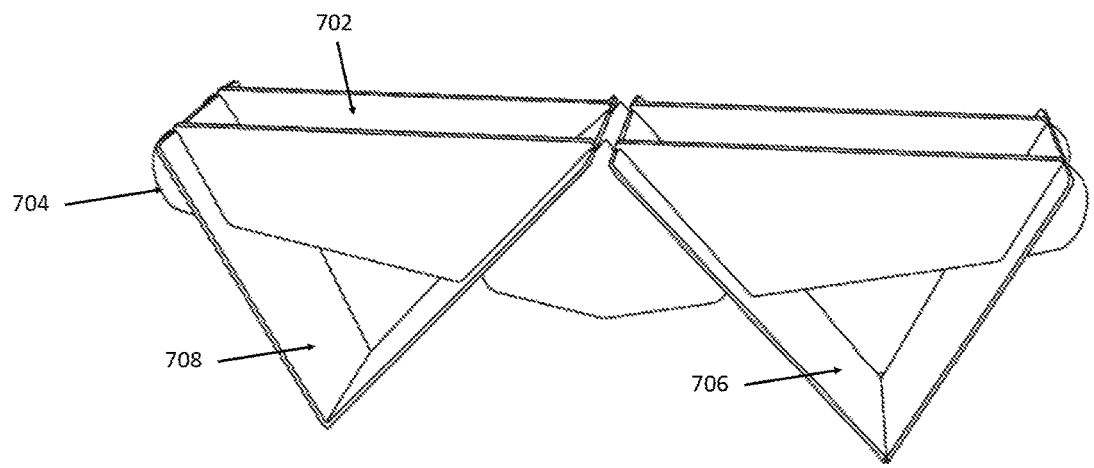
FIG. 7C is a schematic diagram illustrating a perspective view of the first leg and the second leg members and the left support and the right support members of a foldable table when slotted in accordance with an embodiment of the invention.

In various embodiments, in a step 606, the user may flip the support members and any attached members such that the slits on the support members that have not yet had other members slotted are facing upwards. For example, in the step 606, the user may flip the support members 702 and 704 and the leg members 708 and 706 such that the tabletop facing slits on the support members 702 and 704 are facing upwards, as depicted in FIG. 7C and described above.

Figure 7D:
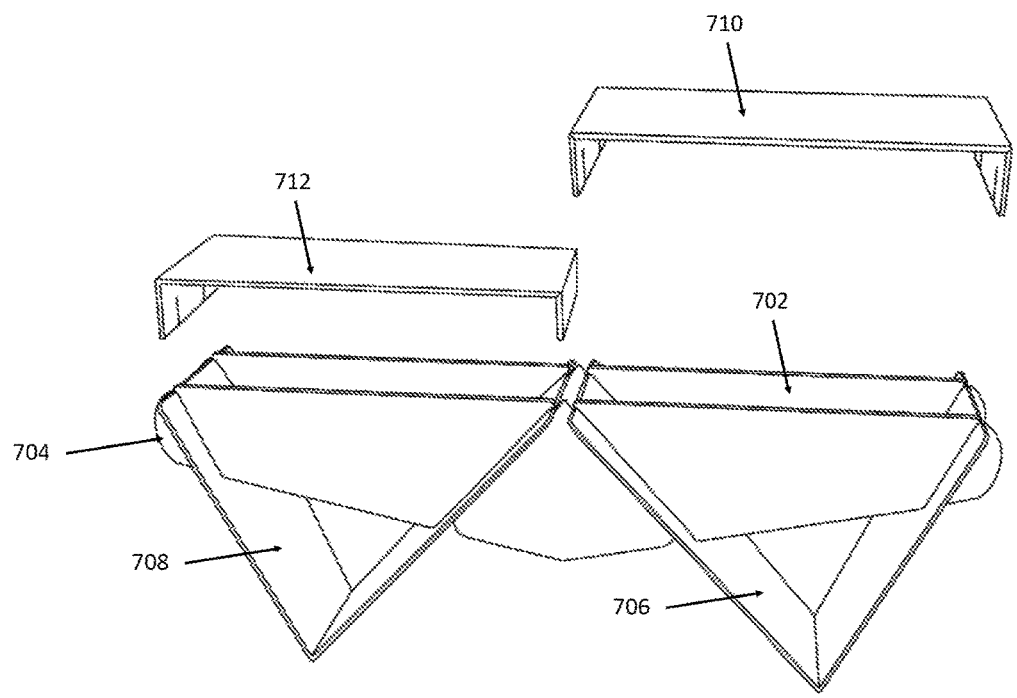
FIG. 7D is a schematic diagram illustrating a perspective view of the first tabletop and the second tabletop members and the first leg and the second leg members and the left support and the right support members of a foldable table when partially slotted in accordance with an embodiment of the invention.

In many embodiments, in a step 608, the user may attach additional members to the support members. For example, in the step 608, the user may slot a first tabletop member 712 together with the support members 702 and 704, and may slot a second tabletop member 710 with the support members 702 and 704 as shown in FIG. 7D and described above.

Figure 7E:
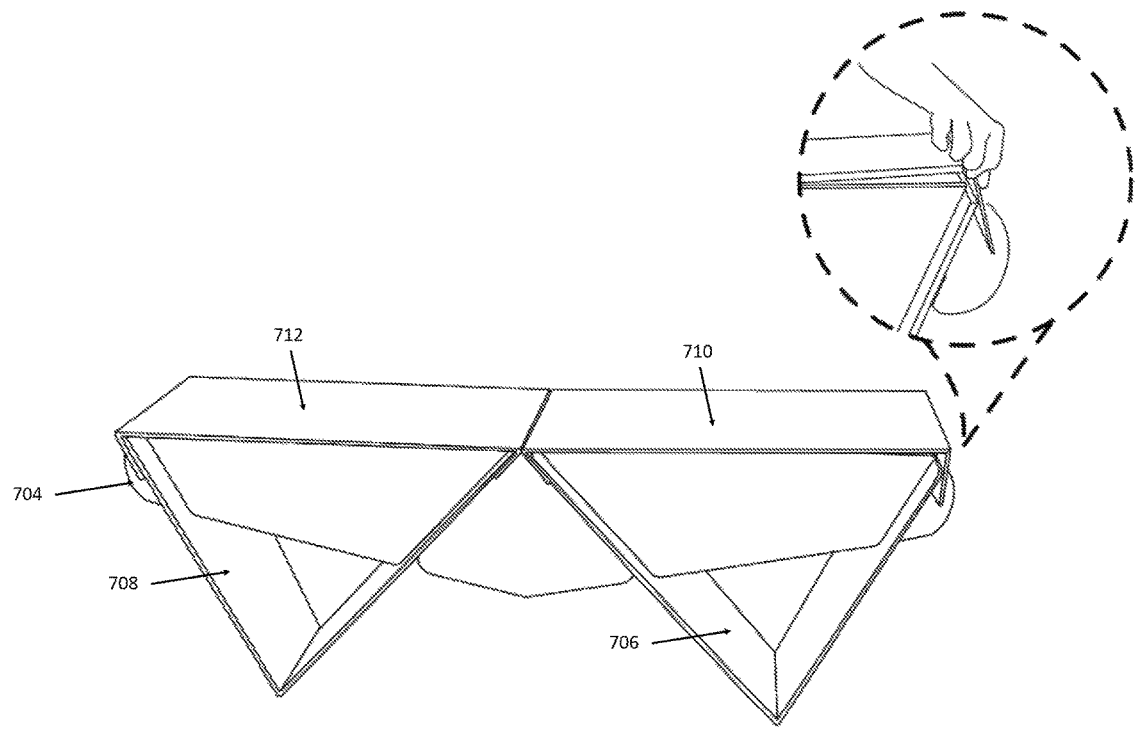
FIG. 7E is a schematic diagram illustrating a perspective view of the assembled foldable table in accordance with an embodiment of the invention.

In some embodiments, in the step 608, the user may tuck the flaps on the tabletop members 710 and 712 to slot to the right support member 704 such that the flaps lie parallel to the leg portions in the leg members 708 and 706, as shown in FIG. 7E and described above.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A foldable table for ready assembly, comprising:
a first leg member for providing support, wherein the first leg member comprises an outer leg portion that includes a left outer slit and a right outer slit and an inner leg portion that includes a left inner slit and a right inner slit, wherein the right inner slit and the right outer slit connect to a right support member, and the left inner slit and the left outer slit connect to a left support member;
a second leg member for providing support, wherein the second leg member comprises an outer leg portion that includes a left outer slit and a right outer slit and an inner leg portion that includes a left inner slit and a right inner slit, wherein the right inner slit and the right outer slit connect to the right support member, and the left inner slit and the left outer slit connect to the left support member;
a first tabletop member for providing a surface to the foldable table, wherein the first tabletop member comprises an outer foldable flap that includes a left outer slit and a right outer slit and an inner foldable flap that includes a left inner slit and a right inner slit, wherein the right inner slit and the right outer slit connect to the right support member, and the left inner slit and the left outer slit connect to the left support member;
a second tabletop member for providing a surface to the foldable table, wherein the second tabletop member comprises an outer foldable flap that includes a left outer slit and a right outer slit and an inner foldable flap that includes a left inner slit and a right inner slit, wherein the right inner slit and the right outer slit connect to the right support member, and the left inner slit and the left outer slit connect to the left support member;
the left support member and the right support member for connecting the first tabletop, the second tabletop, the first leg, and the second leg,
wherein the left support member comprises a first support portion and a second support portion,
wherein the first support portion of the left support member comprises a first upward facing outer tabletop slit and a first upward facing inner tabletop slit for slotting with the outer left slit and the inner left slit on the first tabletop member, respectively, and a first downward facing outer leg slit and a first downward facing inner leg slit for slotting with the outer left slit and the inner left slit on the first leg member, respectively,
wherein the second support portion of the left support member comprises a second upward facing outer tabletop slit and a second upward facing inner tabletop slit for slotting with the outer left slit and the inner left slit on the second tabletop member, respectively, and a second downward facing outer leg slit and a second downward facing inner leg slit for slotting with the outer left slit and the inner left slit on the second leg member, respectively,
wherein the right support member comprises a first support portion and a second support portion,
wherein the first support portion of the right support member comprises a first upward facing outer tabletop slit and a first upward facing inner tabletop slit for slotting with the outer right slit and the inner right slit on the first tabletop member, respectively, and a first downward facing outer leg slit and a first downward facing inner leg slit for slotting with the outer right slit and the inner right slit on the first leg member, respectively,
wherein the second support portion of the right support member comprises a second upward facing outer tabletop slit and a second upward facing inner tabletop slit for slotting with the outer right slit and the inner right slit on the second tabletop member, respectively, and a second downward facing outer leg slit and a second downward facing inner leg slit for slotting with the outer right slit and the inner right slit on the second leg member, respectively.

2. The foldable table in claim 1, wherein the first leg member, the second leg member, the first tabletop member, the second tabletop member, the left support member, and the right support member are made of recyclable cardboard.

3. The foldable table in claim 1, wherein both the first leg and the second leg members include two halves that are each quadrilateral in shape, and both the first leg and the second leg members are configured to fold at a leg folding line, dividing the first leg and the second leg members into two symmetrical leg portions, including the outer leg portion and the inner leg portion.

4. The foldable table in claim 3, wherein the outer leg portion of the first leg member and the outer leg portion of the second leg member have identical dimensions and connect both the first leg and the second leg members to both the right support and the left support members.

5. The foldable table in claim 3, wherein the inner leg portion of the first leg member and the inner leg portion of the second leg member have identical dimensions and connect both the first leg and the second leg members to both the right support and the left support members.

6. The foldable table in claim 1, wherein the first tabletop member and the second tabletop member are rectangular in shape.

7. The foldable table in claim 6, wherein the left outer slit, the right outer slit, the left inner slit, and the right inner slit of both the first tabletop and the second tabletop members have identical dimensions.

8. The foldable table in claim 1, wherein the first upward facing outer tabletop slit and the second upward facing outer tabletop slit of both the left support and the right support members have identical dimensions.

9. The foldable table in claim 1, wherein the first upward facing inner tabletop slit and the second upward facing inner tabletop slit of both the left support and the right support members have identical dimensions.

10. The foldable table in claim 1, wherein the first downward facing outer leg slit and the second downward facing outer leg slit of both the left support and the right support members have identical dimensions.

11. The foldable table in claim 1, wherein the first downward facing inner leg slit and the second downward facing inner leg slit of both the left support and the right support members have identical dimensions.

12. A method for creating a foldable table for ready assembly comprising:
    placing a left support member on the ground, the left support member comprising upward facing tabletop slits that include a first upward facing outer tabletop slit, a first upward facing inner tabletop slit, a second upward facing outer tabletop slit, a second upward facing inner tabletop slit, and downward facing leg slits that include a first downward facing outer leg slit, a first downward facing inner leg slit, a second downward facing outer leg slit, and a second downward facing inner leg slit, such that the upward facing tabletop slits are face down to the ground and the downward facing leg slits are facing upwards;
    placing a right support member parallel to the left support member on the ground, the right support member comprising upward facing tabletop slits that include a first upward facing outer tabletop slit, a first upward facing inner tabletop slit, a second upward facing outer tabletop slit, a second upward facing inner tabletop slit, and downward facing leg slits that include a first downward facing outer leg slit, a first downward facing inner leg slit, a second downward facing outer leg slit, and a second downward facing inner leg slit, such that the upward facing tabletop slits are face down to the ground and the downward facing leg slits are facing upwards;
    attaching a first leg member to the left support member and the right support member, wherein the first leg member comprising an outer leg portion that includes a right outer slit and a left outer slit and an inner leg portion that includes a right inner slit and a left inner slit, by slotting the right inner slit to the first downward facing inner leg slit of the right support member, the right outer slit to the first downward facing outer leg slit of the right support member, the left inner slit to the first downward facing inner leg slit of the left support member, and the left outer slit to the first downward facing outer leg slit of the left support member;
    attaching a second leg member to the left support member and the right support member, wherein the second leg member comprising an outer leg portion that includes a right outer slit and a left outer slit and an inner leg portion that includes a right inner slit and a left inner slit, by slotting the right inner slit to the second downward facing inner leg slit of the right support member, the right outer slit to the second downward facing outer leg slit of the right support member, the left inner slit to the second downward facing inner leg slit of the left support member, and the left outer slit to the second downward facing outer leg slit of the left support member;
    flipping the left support member and the right support member with the first leg member and the second leg member attached such that the upward facing tabletop slits are facing upwards and the downward facing leg slits are facing down to the ground;
    attaching a first tabletop member to the left support member and the right support member, wherein the first tabletop member comprising an outer foldable flap that includes a right outer slit and a left outer slit and an inner foldable flap that includes a right inner slit and a left inner slit, by slotting the right inner slit to the first upward facing inner tabletop slit of the right support member, the right outer slit to the first upward facing outer tabletop slit of the right support member, the left inner slit to the first upward facing inner tabletop slit of the left support member, and the left outer slit to the first upward facing outer tabletop slit of the left support member;
    attaching a second tabletop member to the left support member and the right support member, wherein the second tabletop member comprising an outer foldable flap that includes a right outer slit and a left outer slit and an inner foldable flap that includes a right inner slit and a left inner slit, by slotting the right inner slit to the second upward facing inner tabletop slit of the right support member, the right outer slit to the second upward facing outer tabletop slit of the right support member, the left inner slit to the second upward facing inner tabletop slit of the left support member, and the left outer slit to the second upward facing outer tabletop slit of the left support member.

13. The method of claim 12, wherein the first leg member, the second leg member, the first tabletop member, the second tabletop member, the left support member, and the right support member are made of recyclable cardboard.

14. The method of claim 12, wherein both the first leg and the second leg members include two halves that are each quadrilateral in shape, and both the first leg and second leg members are configured to fold at a leg folding line, dividing the first leg and the second leg members into two symmetrical leg portions, including the outer leg portion and the inner leg portion.

15. The method of claim 14, wherein the left outer slit and the right outer slit of both the first leg and the second leg members have identical dimensions.

16. The method of claim 14, wherein the left inner slit and the right inner slit of both the first leg and the second leg members have identical dimensions.

17. The method of claim 12, wherein the first tabletop member and the second tabletop member are rectangular in shape.

18. The method of claim 17, wherein the left outer slit, the right outer slit, the left inner slit, and the right inner slit of both the first tabletop and the second tabletop members have identical dimensions.

19. The method of claim 12, wherein the first upward facing outer tabletop slit and the second upward facing outer tabletop slit of both the left support and the right support members have identical dimensions, and the first upward facing inner tabletop slit and the second upward facing inner tabletop slit of both the left support and the right support members have identical dimensions.

20. The method of claim 12, wherein the first downward facing outer leg slit and the second downward facing outer leg slit of both the left support and the right support members have identical dimensions, and the first downward facing inner leg slit and the second downward facing inner leg slit of both the left support and the right support members have identical dimensions.

\* \* \* \* \*